dstates Patent Office 3,412,121
Patented Nov. 19, 1968

3,412,121
BIS(CYANOALKYLENE-, HYDROXYTIN) OXIDES
William J. Considine, Somerset, and Gerald H. Reifenberg, Plainfield, N.J., assignors to M & T Chemicals Inc., New York, N.Y., a corporation of Delaware
No Drawing. Filed Jan. 3, 1966, Ser. No. 517,939
7 Claims. (Cl. 260—429.7)

This invention relates to tetravalent organotin compounds of the type characterized by the presence of nitrile groups of the formula:

$$[NC(CH_2)_m]-$$

wherein $m$ is an integer at least about 2. More particularly, this invention is concerned with an intermediate hydrolysis product of an organotin compound of the aforenamed type in the form of a bis(oxide) containing a hydroxy group attached to each tin atom, and a method of preparing the same.

The organotin compounds of this invention have the general formula:

$$\{[NC(CH_2)_m]SnOH\}_2O$$

in which $m$ has the same meaning as depicted above. Preferably $m$ is an integer 2–4. Advantageously these compounds are prepared by reacting a halide of the general formula:

$$[NC(CH_2)_m]_2SnX_2$$

in which X is chlorine, bromine or iodine, with a hydroxide selected from the group consisting of ammonium hydroxide and an alkali metal hydroxide. The bis(oxide) thus formed is recovered from the reaction mixture.

The dihalides used in the method of this invention may be prepared by any suitable methods. Preferably they are prepared by the methods described in our copending patent applications entitled "Organotin Complexes" and "Organotin Halides." In the former application the dihalides are prepared by redistribution of a 1:1 complex of the formula:

$$[NC(CH_2)_m]_4Sn \cdot SnX_4$$

In the latter application the dihalides are prepared by reacting an active halogen with an organotin of the formula:

$$[NC(CH_2)_m]_2SnR_2$$

in which R can be an alkyl, aryl, alkaryl, aralkyl or alkenyl. The dihalides prepared by either of these two methods are found to be very pure, and therefore particularly desirable for the process of this invention. Among the three types of dihalides, the dibromide of the formula:

$$[NC(CH_2)_m]_2SnBr_2$$

The hydroxide used in the hydrolysis reaction may be advantageously ammonium hydroxide. It is understood the aqueous solution of ammonia provides the same beneficial results. Other alkali metal hydroxides that are found to be eminently suitable may include sodium hydroxide and potassium hydroxide. The hydroxide used for the reaction should be at least twice the molar content of the dihalides.

In one preferred embodiment of this invention, the hydrolysis reaction of this invention may be represented by a typical reaction stated hereinbelow:

$$2(NCCH_2CH_2)_2SnBr_2 + 4NH_3 + 3H_2O \xrightarrow[\text{THF}]{\text{aqueous}}$$
$$[(NCCH_2CH_2)_2SnOH]_2O + 4NH_4Br$$

It is understood that organotin chloride and iodide may be used instead of the bromide, and NaOH or KOH is equally suitable for the hydrolysis reaction. The reaction of this invention is highly exothermic. Generally external cooling of the reaction vessel is needed to insure high yield.

The above mentioned reaction is completely unexpected because it deviates from the normal organotin halide reaction. For example diethyltin dichloride which when reacted with a base forms dialkyltin oxide ($R_2SnO$). If the reaction of this invention follows the expected reaction mechanism, it would proceed as follows:

$$(NCCH_2CH_2)_2SnBr_2 + NH_4OH \rightarrow$$
$$(NCCH_2CH_2)SnO + 2NH_4Br + H_2O$$

The elemental analysis of the reaction product however rules out the formation of the oxide or the hydroxide in the present case.

The bis(oxide) of this invention which contains hydroxy group attached to each tin atom is a valuable intermediate for the preparation of other organotin derivations. The bis(oxide)s themselves may also apply as biocides or stabilizers for plastics.

Further to illustrate this invention specific examples are described hereinbelow.

Example 1.—Preparation of bis[di(2-cyanoethyl) hydroxytin]oxide $$2(NCCH_2CH_2)_2SnBr_2 + 4NH_3 + 3H_2O \xrightarrow[\text{THF}]{\text{aqueous}}$$
$$[(NCCH_2CH_2)_2SnOH]_2O + 4NH_4Br$$

To 19.3 g. (0.05 mole) of bis(2-cyanoethyl)tin dibromide in 50 ml. of tetrahydrofuran was added slowly 15.0 g. (0.25 mole) of concentrated ammonia diluted with 50 ml. of distilled water. A white precipitate of bis[di(2-cyanoethyl) hydroxytin]oxide precipitated immediately and the reaction was moderated with a cold water bath. After an additional 10 minutes of stirring, the mixture was filtered with suction and the solids washed with water until bromide-free. The solids, after drying in a circulating over at 50°, weighed 10.1 g. (83.5%). M.P.=195° (dec.).

Analysis.—Calcd. for $C_{12}H_{18}N_4O_3Sn_2$: Sn, 47.16; N, 11.11. Found for $C_{12}H_{18}N_4O_3Sn_2$: Sn, 46.96; N, 11.23.

Example 2

Instead of ammonia and water, sodium hydroxide solution was used. The resultant solids obtained have a melting point=195° C. (dec., turn yellow). The yield was about 54.6%.

We claim:
1. A method for preparing organotin of the general formula:

$$\{[NC(CH_2)_m]_2SnOH\}_2O$$

in which $m$ is an integer at least about 2, which comprises reacting (i) a nitrile of the general formula:

$$[NC(CH_2)_m]_2SnX_2$$

in which X is selected from the group consisting of chlorine, bromine and iodine with (ii) a hydroxide selected from the group consisting of ammonium hydroxide and an alkali metal hydroxide recovering said organotin.

2. A method according to claim 1 wherein said $m$ is less than 5.

3. A method according to claim 1 wherein $m$ is 2, X is bromine, and the hydroxide is ammonium hydroxide.

4. A method according to claim 1 wherein the reaction is carried out at a temperature below 20° C.

5. An organotin of the general formula:

$$\{[NC(CH_2)_m]_2SnOH\}_2O$$

in which $m$ is an integer at least about 2.

6. An organotin according to claim 5 wherein $m$ is less than 5.

7. An organotin according to claim 4 wherein the formula is:

$$[(NCCH_2CH_2)_2SnOH]_2O$$

References Cited

UNITED STATES PATENTS 2,893,856  6/1959  Ramsden et al. _____ 260—429.7
3,082,230  3/1963  Dorfelt et al. _____ 260—429.7

OTHER REFERENCES

Dub, Organometallic Compounds, vol. II, 1961, pp. 156–7.

TOBIAS E. LEVOW, *Primary Examiner.*

W. F. W. BELLAMY, *Assistant Examiner.*